United States Patent
Classen et al.

(10) Patent No.: US 8,336,382 B2
(45) Date of Patent: Dec. 25, 2012

(54) ACCELERATION SENSOR AND METHOD FOR ITS MANUFACTURE

(75) Inventors: Johannes Classen, Reutlingen (DE);
Arnd Kaelberer, Schlierbach (DE);
Patrick Wellner, Stuttgart (DE);
Dietrich Schubert, Reutlingen (DE);
Lars Tebje, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 464 days.

(21) Appl. No.: 12/610,961

(22) Filed: Nov. 2, 2009

(65) Prior Publication Data

US 2010/0107762 A1 May 6, 2010

(30) Foreign Application Priority Data

Nov. 6, 2008 (DE) .................... 10 2008 043 524

(51) Int. Cl.
*G01P 15/125* (2006.01)
(52) U.S. Cl. .................. 73/514.32; 73/514.38
(58) Field of Classification Search ............... 73/514.24, 73/514.38, 514.36, 514.29, 514.32
See application file for complete search history.

(56) References Cited

U.S. PATENT DOCUMENTS

| | | | | |
|---|---|---|---|---|
| 4,893,509 A * | 1/1990 | MacIver et al. | ............ | 73/514.29 |
| 5,756,901 A * | 5/1998 | Kurle et al. | ............ | 73/777 |
| 5,983,721 A * | 11/1999 | Sulzberger et al. | ........ | 73/514.32 |
| 6,230,566 B1 * | 5/2001 | Lee et al. | ............ | 73/514.32 |
| 6,612,029 B2 * | 9/2003 | Behin et al. | ............ | 29/847 |
| 6,718,605 B2 * | 4/2004 | Yazdi et al. | ............ | 29/25.42 |
| 6,923,061 B2 * | 8/2005 | Tsubaki | ............ | 73/514.32 |
| 7,140,250 B2 * | 11/2006 | Leonardson et al. | ...... | 73/504.14 |
| 7,343,801 B2 * | 3/2008 | Kapser et al. | ............ | 73/514.32 |
| 7,418,864 B2 * | 9/2008 | Asami et al. | ............ | 73/514.32 |
| 7,578,189 B1 * | 8/2009 | Mehregany | ............ | 73/514.18 |
| 7,600,428 B2 * | 10/2009 | Robert et al. | ............ | 73/514.32 |
| 2010/0175473 A1 * | 7/2010 | Classen | ............ | 73/514.29 |

* cited by examiner

*Primary Examiner* — Helen C. Kwok
(74) *Attorney, Agent, or Firm* — Kenyon & Kenyon LLP

(57) ABSTRACT

An acceleration sensor is described that has a base substrate, a first electrode structure situated in stationary fashion relative to the base substrate, a sensor element having a first electrode area, and a spring device having at least one spring element. Via the spring element, the sensor element is coupled to the base substrate so that the sensor element is deflected relative to the base substrate as the result of an acceleration acting on the sensor element, thus changing the distance between the first electrode structure and the first electrode area. The sensor element and the first electrode structure are situated at least partially one over the other and are formed from a common functional layer.

10 Claims, 10 Drawing Sheets

Prior Art

ACCELERATION SENSOR AND METHOD FOR ITS MANUFACTURE

RELATED APPLICATION INFORMATION

The present application claims priority to and the benefit of German patent application no. 10 2008 043 524.4, which was filed in Germany on Nov. 6, 2008, the disclosure of which is incorporated herein by reference.

FIELD OF THE INVENTION

The present invention relates to a micromechanical acceleration sensor having a sensor element that is deflectable relative to a base substrate and that acts as a seismic mass, and at least one detection electrode that is stationary relative to the base substrate. Here, both the sensor element and the at least one detection electrode are realized in a common functional plane. In addition, the present invention relates to a manufacturing method for such an acceleration sensor.

BACKGROUND INFORMATION

In order to measure acceleration, acceleration sensors can be used that are based on the spring-mass principle. In such a sensor, the deflection caused by an acceleration of an oscillating mass suspended on at least one spring element is acquired relative to a substrate that acts as a reference system. When the properties of the spring-mass system are known, the acceleration force acting thereon can be inferred from the behavior of the sensor. In the case of a capacitive acceleration sensor, the detection of an acceleration takes place for example by evaluating a change in capacitance that occurs due to a change in the distance between an electrode area of the oscillating body, which is held at a particular electrical potential, and an electrode that is situated so as to be stationary relative to the base substrate.

Acceleration sensors can be manufactured as micromechanical components. In so-called MEMS (Micro-Electro-Mechanical Systems), the mechanical components of an acceleration sensor are realized on, or from, the common semiconductor substrate, together with electrical circuits.

In capacitive sensor designs that operate according to the spring-mass principle, the detection of the deflection in the case of z-accelerations takes place using electrodes that are situated underneath or above the movable structure of the sensor. Here, only horizontally structured structures are used whose verticals are made up of almost vertical walls.

An object of the exemplary embodiments and/or exemplary methods of the present invention is to provide a micromechanically produced acceleration sensor having a construction whose functional design is compact, and that can be manufactured economically. This is achieved by an acceleration sensor as described herein, in which the sensor element and the detection electrodes are formed from a common functional layer. In addition, the object of the exemplary embodiments and/or exemplary methods of the present invention may be achieved by a method for manufacturing such a sensor as further described herein.

The exemplary embodiments and/or exemplary methods of the present invention provides an acceleration sensor that includes a first electrode structure that is stationary relative to a base substrate and a sensor element, having a first electrode area, that is capable of being deflected relative to the base substrate. Here, the sensor element is elastically coupled to the base substrate via at least one spring element, the distance between the first electrode structure and the first electrode area being changed when there is a deflection of the sensor element relative to the base substrate due to an acceleration. Here it is provided that the sensor element and the first electrode structure are realized so as to be situated at least partially one over the other within a common functional plane. Because the electrode structure and the electrode area of the sensor element are situated over or under one another, so that they have a common area of intersection in the x-y plane defined by the base substrate, a particularly compact construction is enabled.

In addition, due to the high degree of mechanical decoupling of the movable structure from layers situated above and beneath this structure, this sensor design has advantages with regard to robustness relative to external mechanical bending that can occur for example as a result of packaging. Because in the area of the sensor element the electrode structure runs at a spatial distance from the base substrate, the sensor is also decoupled to a great extent from surface charges that can occur on the substrate or on a substrate layer. Inter alia, this results in an improved zero stability of the sensor signal when there is a change of temperature.

An advantageous specific embodiment of the present invention provides a sensor element that is formed from a first and a second partial layer of the functional layer, the first electrode area and the first electrode structure, or a part of the second electrode structure corresponding to the second electrode area, each being formed from different sub-layers of the common functional layer. With the aid of the two-part design of the functional layer, the vertical structuring of the sensor components can be realized in a particularly simple manner.

Another advantageous specific embodiment provides that the sensor element includes a second electrode area that corresponds to a second electrode structure, which is stationary relative to the base substrate, in such a way that a deflection of the sensor element relative to the base substrate also causes a change in the distance between the second electrode structure and the second electrode area. Here, the second electrode area is formed from one of the two sub-layers of the overall functional layer, while the second electrode structure, or the part of the second electrode structure corresponding to the second electrode area, is formed from the other of the two sub-layers. With the aid of the second electrode structure, a differential, and thus also more precise, evaluation of the changing capacitance can be realized. If the first and the second electrode structure are situated on both sides of the spring element as two sub-electrodes of a single detection electrode, in this way it is also possible to compensate undesired movements, such as for example spurious oscillations, of the sensor element in the z direction.

In another specific embodiment of the present invention, the sensor element is realized in the form of a rocker that has two wings having an asymmetrical distribution of mass, and that is coupled rotatably to the base substrate via two spring elements fashioned as torsion webs. This sensor design enables a differential evaluation of the change in capacitance caused by a deflection of the seismic mass. An additional mass situated on one of the two wings enables the sensitivity of the sensor to be set.

Another advantageous specific embodiment of the present invention provides a sensor element that is fashioned in the form of a trampoline, having four wings connected to one another by respective webs. Between the wings there is situated a spring element that runs from the respective web to a central fastening base. In addition, the wings have an essentially symmetrical mass distribution. The trampoline-type sensor design enables a directional detection of the acceleration.

According to another advantageous specific embodiment of the present invention, it is provided that the spring elements are formed from the first and/or second sub-layer. In this way, the spring strength of the spring elements used can be varied between at least two levels, in a particularly simple manner.

In addition, the exemplary embodiments and/or exemplary methods of the present invention provides a method for manufacturing such an acceleration sensor in which a first sub-layer of a functional layer is deposited on a first sacrificial layer situated on a base substrate. The first sub-layer is then structured in order to produce a first plane of a sensor element and a first electrode structure, spatially separate therefrom. Subsequently, a second sacrificial layer is deposited on the first functional layer in the area of the first electrode structure, and a second sub-layer of the functional layer is then in turn deposited on this second sacrificial layer. The second sub-layer is structured in order to produce a second plane of the sensor element. Finally, the two sacrificial layers are removed. Through the use of the two sub-layers and the two sacrificial layers, the movement sensor can be produced using currently standard methods. In this way, the sensor manufacture can be incorporated into existing process sequences relatively easily.

In the following, the exemplary embodiments and/or exemplary methods of the present invention is explained in more detail on the basis of Figures.

DETAILED DESCRIPTION

Figure 1:
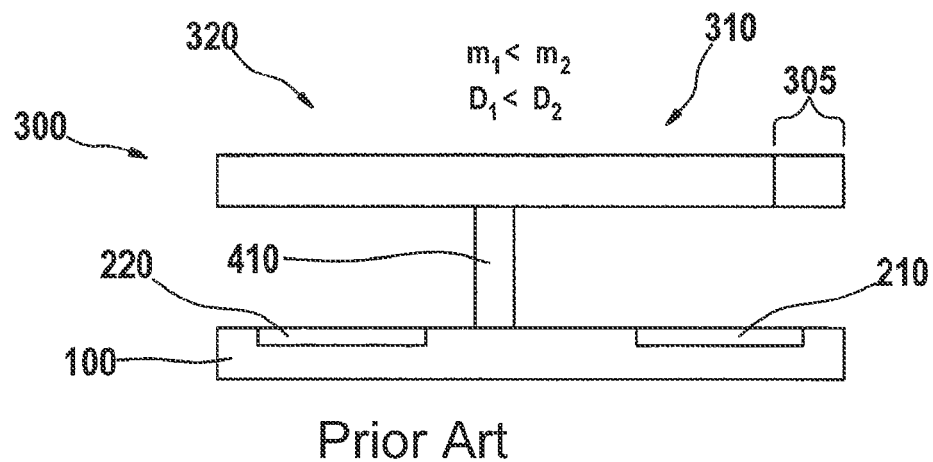
FIG. 1 shows a micromechanical acceleration sensor according to the prior art.
Figure 2:
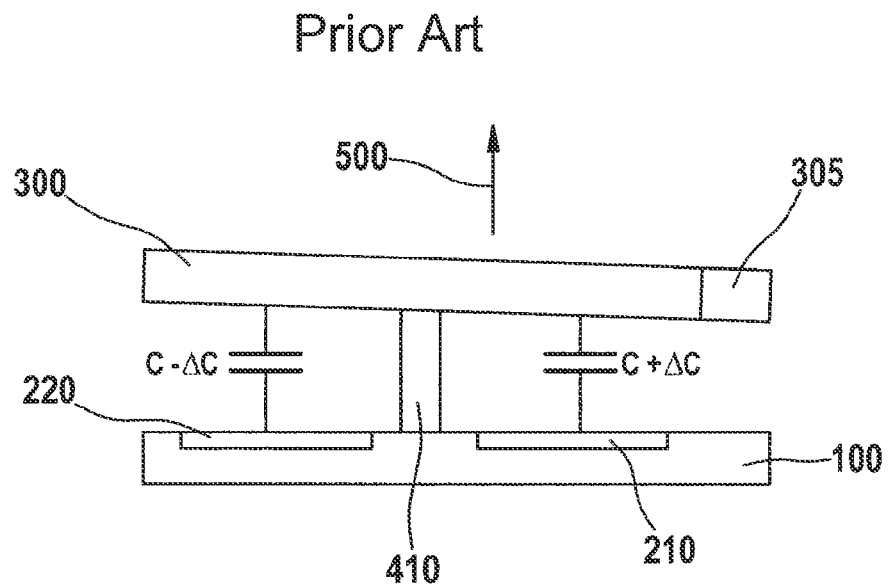
FIG. 2 shows another micromechanical acceleration sensor according to the prior art.

FIG. 1 shows a conventional capacitive acceleration sensor, fashioned as a rocker. Such sensors have a direction of detection that is perpendicular to the wafer plane. In this sensor design, based on a spring-mass system, a movable seismic mass 300 forms, together with electrodes 210, 220 situated on substrate 100, a respective plate capacitor. Sensor element 300 is connected to substrate 100 situated under it by a flexible spring 410. The sensor element has two wing structures 310, 320, having different mass structures. In the present case, the mass difference is realized by an additional mass 305 on right wing 310. As is shown in FIG. 2, due to this mass difference a deflection of rocker 300 relative to substrate 100 takes place when an acceleration having a component perpendicular to the substrate acts on the sensor. Caused by this, the distance between the electrodes changes, which causes a change in the capacitance of the two plate capacitors formed respectively by an electrode structure 210, 220 and a wing 310, 320 of rocker 300. This change in capacitance represents a measure of the acting acceleration.

Figure 3:
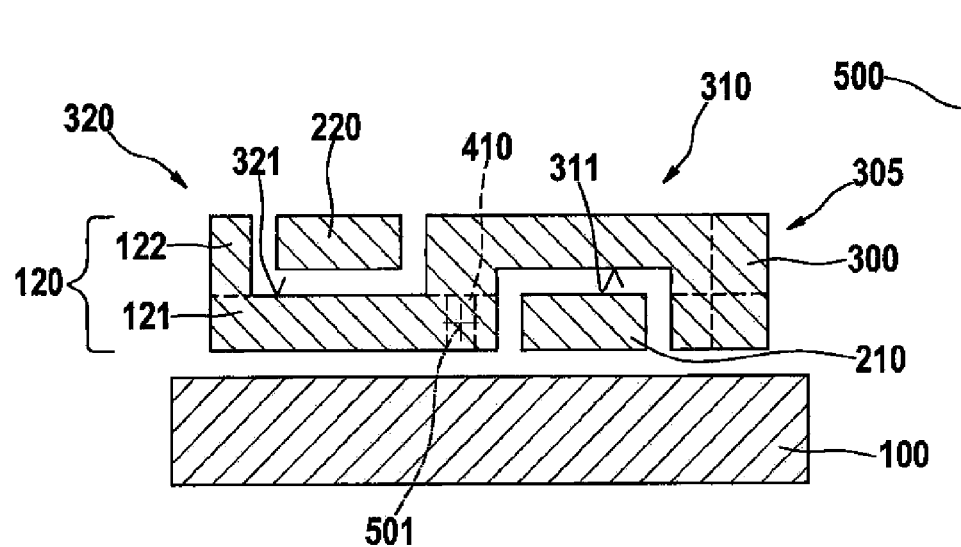
FIG. 3 shows a cross-section through a rocker-shaped acceleration sensor according to the present invention.

FIG. 3 shows a cross-section through an acceleration sensor according to the exemplary embodiments and/or exemplary methods of the present invention in which seismic mass 300 and detection electrodes 210, 220 are formed within a common functional layer 120. Here, sensor element 300 is shown as an example in the form of a rocker that is capable of rotation around an axis of rotation 501. The rocker has two wings 310, 320 that have, in comparison with each other, an asymmetrical mass distribution relative to axis of rotation 501. Such a mass distribution can be realized for example via an additional mass 305 on right wing 310. As can be seen from the cross-sectional representation in FIG. 3, both rocker body 300 and the two electrode structures 210, 220 are realized as self-supporting structures that are decoupled from substrate 100. For the suspension of the rocker, two spring elements 410, 420, fashioned as torsion rods, are used that are situated on either side of rocker element 300. Rocker body 300 may have a two-layer construction and has a stepped profile due to the connection shown here of the two sub-layers 121, 122. The stepped profile is caused by the integration of the two detection electrodes 210, 220 into functional layer 120, because corresponding openings in rocker body 300 are provided for electrodes 210, 220, which in the present example have rectangular cross-sections.

In the sensor system, which here may have a micromechanical construction, an acceleration in direction 500 orthogonal to the surface of base substrate 100 causes a rotation of rocker body 300 in the clockwise direction. Caused by this, the distance becomes smaller between first electrode 210 and an electrode area 311, situated above said electrode, of right wing 310, while the distance increases between second electrode structure 220 and electrode area 321 of the rocker, situated under said structure. A detection of the deflection of rocker body 300 takes place for example by evaluating the capacitance between electrode structures 210, 220 and rocker body 300.

Figure 4:
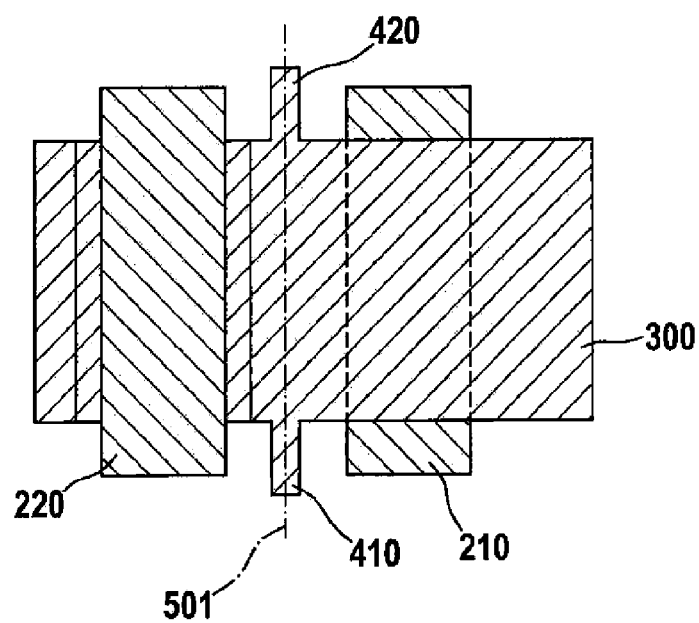
FIG. 4 shows a top view of the sensor shown in FIG. 3.

FIG. 4 shows the sensor system of FIG. 3 in a top view. The two spring elements 410, 420 that define axis of rotation 501 for sensor element 300 are also shown here. The properties of spring device 400 formed from the two spring elements 410, 420, such as for example their spring hardness, is determined by, inter alia, their cross-sectional profile, their length, and the material used for these torsion webs. Each of the two torsion webs 410, 420 may be coupled to base substrate 100 mechanically via corresponding anchor structures (not shown).

As is shown in FIG. 4, the two electrode structures 210, 220 may extend over the entire width of sensor element 300. This achieves a higher capacitance, permitting better detectability of the occurrent changes in capacitance. Each of the two self-supporting electrode structures 210, 220 situated in the area of sensor element 300 is coupled to base substrate 100 via at least one anchor point (not shown). The fashioning of electrode structures 210, 220 in the area of sensor element 300 as self-supporting webs not connected to base substrate 100 permits a good mechanical decoupling of these components and of sensor element 300 from external mechanical influences. Due to the self-supporting situation of electrode structures 210, 220 and the resulting spatial distance relative to base substrate 100, the greatest possible electrical decoupling of these structures 210, 220 from base substrate 100 is also realized. This permits the realization of a sensor having high sensitivity.

Through a detection electrode formed as two sub-electrodes 210, 220 situated on either side of the axis of rotation and connected to each other, it is possible to realize a compensation of undesirable z-movements that may occur for example due to the excitation of spurious modes. In addition, in this way the capacitance of the system can also be increased, permitting better evaluation.

Figure 5:
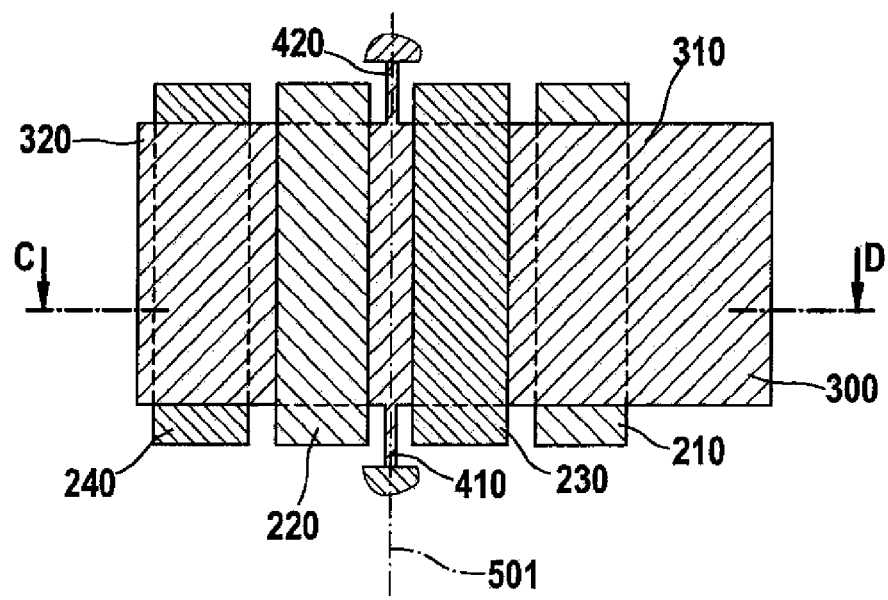
FIG. 5 shows a top view of an acceleration sensor according to the present invention having fully differential evaluation.
Figure 6:
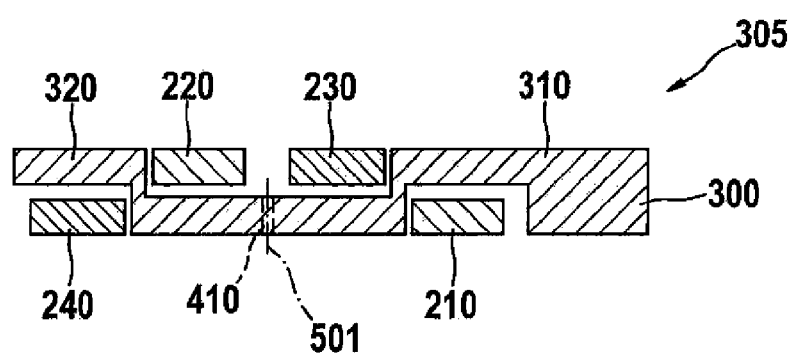
FIG. 6 shows a cross-section through the rocker-shaped sensor shown in FIG. 5, along the line C-D.

In order to increase the precision of the sensor system according to the exemplary embodiments and/or exemplary methods of the present invention, the evaluation of a change in capacitance caused by a deflection of sensor element 300 can also take place in differential fashion. For this purpose, as is shown for example in FIG. 5, corresponding electrode structures 210, 220, 230, 240 can be situated symmetrically to axis of rotation 501 on both wings 310, 320 of sensor element 300. Through the situation of electrode structures 210, 220, 230, 240, there results the cross-sectional profile shown in FIG. 6 of sensor 300 along the line C-D. This profile, or the situation of the corresponding electrode structures, can vary as a function of the particular application. Through the realization of each electrode pair as two sub-electrodes on both sides of axis of rotation 501, a compensation is made possible of undesirable z-movements in an electrode, resulting for example from the excitation of higher spurious modes. In this way, a better offset stability and reduced sensitivity errors of the sensor may be expected.

Figure 7:
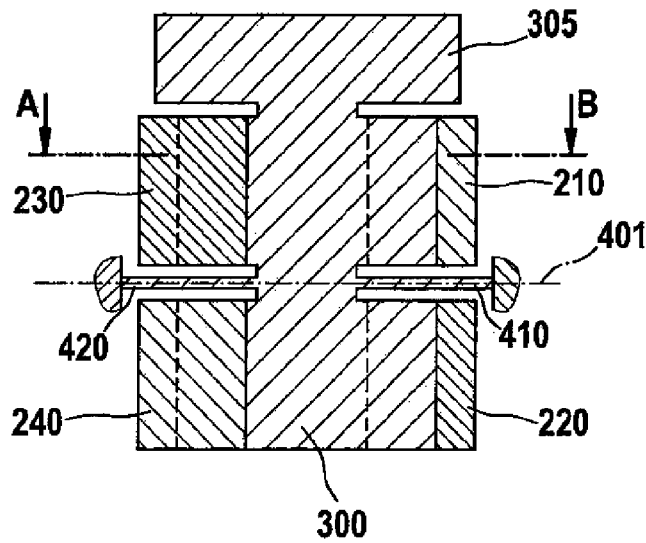
FIG. 7 shows a top view of another acceleration sensor realized as a rocker, having four electrodes situated in mirror-symmetrical fashion.

Another possibility for the differential evaluation of the sensor signal is offered by the situation shown in FIG. 7 of electrode structures 210, 220, 230, 240. Here, electrode structures 210, 220, and 230, 240, respectively formed from the same sub-layer 121, 122 of the common functional layer 120, are situated mirror-symmetrically to one another relative to axis of rotation 501, the respectively associated sub-electrodes 210, 240 and 220, 230 being cross-connected to one another. FIG. 7 further illustrates the possibility of lengthening the torsion webs through correspondingly shaped cuts in sensor body 300, or reducing the space requirement of the corresponding spring elements 410, 420 outside the sensor element.

Figure 8:
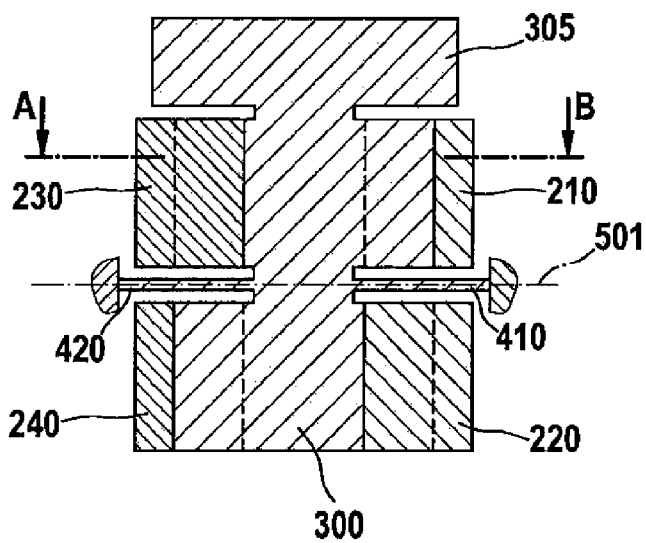
FIG. 8 shows a top view of another acceleration sensor, realized as a rocker, having four electrodes situated in rotationally symmetrical fashion.

Another arrangement of the four electrode structures 210, 220, 230, 240 is shown in FIG. 8. Here, electrode structures 210, 220 and 230, 240, respectively formed from the same sub-layer 121, 122 of common functional layer 120, are situated in rotationally symmetrical fashion to one another relative to the center, defined by the two torsion webs 410, 420, of rocker body 300, the respectively associated sub-electrodes 210, 220 and 230, 240 being situated or connected to one another in mirror-symmetrical fashion relative to axis of rotation 501. As is also the case in the system shown in FIG. 7, the evaluation of the change in capacitance caused by a deflection of the rocker body also takes place in fully differential fashion in the system shown in FIG. 8. Due to the higher degree of symmetry of the mechanical structure, advantages may be expected with respect to the avoidance of a tilting movement perpendicular to the actual tilt axis 501. This is also true of the behavior of the sensor in the case of rotational accelerations. This is the case in particular if the thickness, and thus the mass conditions, of the lower and upper sub-layer 121, 122 are different, which under some circumstances cannot be completely avoided for process-related reasons. In contrast, bending due to the crossed situation of the electrodes in the sensor of FIG. 7 can have a less strong effect on the sensor performance.

Figure 9:
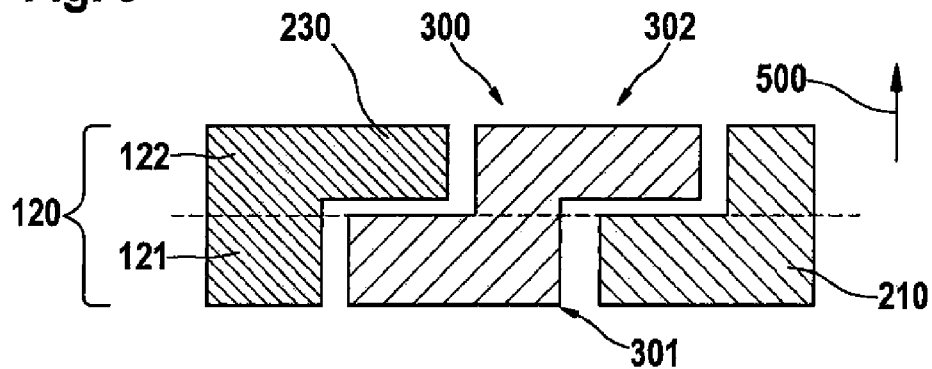
FIG. 9 shows a cross-sectional representation through the sensor shown in FIG. 7 and FIG. 8, along the line A-B.

As further illustration, FIG. 9 shows a cross-sectional representation of the sensor system of FIG. 7, along the line A-B. Here, the part of the longer wing 310 of rocker structure 300 that forms first electrode area 311 overlaps first electrode structure 210 situated thereunder, while the lower part of wing 310, formed from first sub-layer 121 and third electrode area 331, is situated underneath third electrode structure 230. A deflection of rocker body 300 due to an acceleration in direction 500, perpendicular to base substrate 100, would in the present case cause an increase in the capacitance between rocker body 300 and first electrode structure 210 and a decrease in the capacitance between rocker body 300 and third electrode structure 230.

Figure 10:
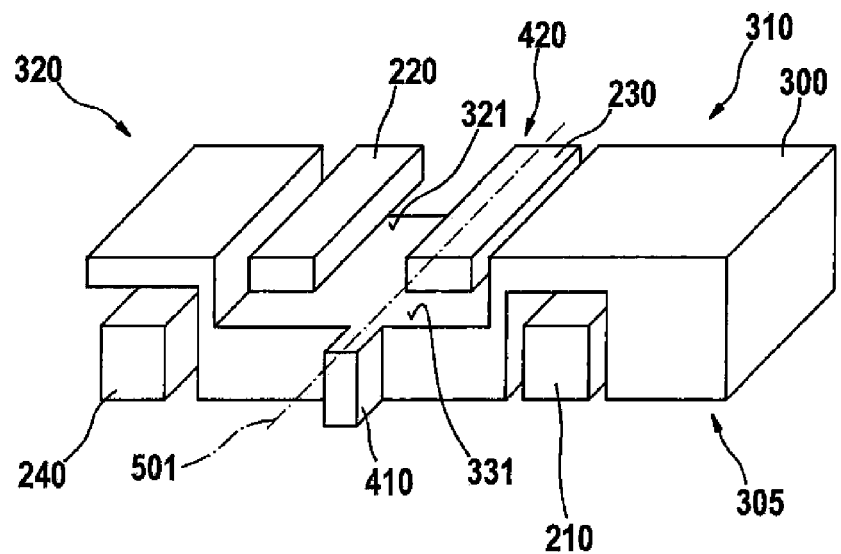
FIG. 10 shows a sensor element fashioned as a rocker structure, having four electrode structures and a torsion element having a reduced spring strength.
Figure 11:
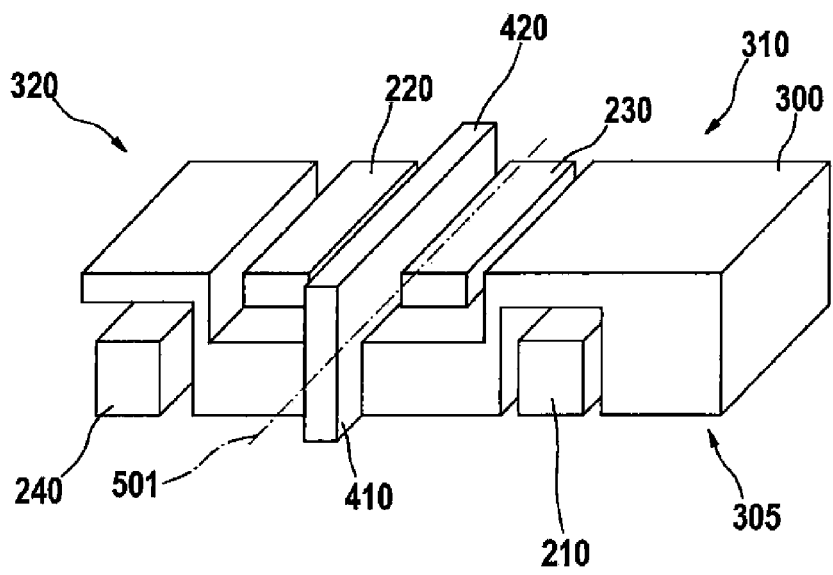
FIG. 11 shows a sensor element fashioned as a rocker structure, having four electrode structures and a torsion element having full spring strength.

The following two FIGS. 10 and 11, illustrate the possibility of producing different spring strengths of spring elements 410, 420, 430, 440 with the aid of the two-layer construction of functional layer 120. FIG. 10 shows a perspective view of the components of the acceleration sensor, fashioned as a rocker, of FIGS. 5 and 6. In the system shown in FIG. 10, spring elements 410, 420 are formed only from first sub-layer 121, while the system according to FIG. 11 has spring elements 410, 420 constructed from both sub-layers 121, 122 of functional layer 120. Because the spring strength of a spring element is a function of, inter alia, its cross-sectional profile, with the aid of the reduced spring thickness it is possible to realize particularly soft springs, which in turn offer advantages with respect to the space requirement of the sensor core or with respect to sensitivity. In addition, very sensitive sensors can also be realized in this way. The reduction of the spring thickness also makes it possible to construct the spring elements with a greater width. Spring elements having a greater width make it possible to reduce a possible influence of process scatter on the spring properties.

On the other hand, with the aid of a thicker spring element 410, 420 of the sensor system of FIG. 11, it is possible to reduce undesired translational deflections of rocker 300 in z-direction 500, which can for example have an adverse effect on the sensitivity or on the zero error.

A further adaptation of the spring strength, or of additional properties of spring device 400 of the sensor system, can be achieved by varying the width and the length of the spring elements. By combining these possibilities, the properties of the spring-mass system can be adapted to meet any requirements.

Figure 12:
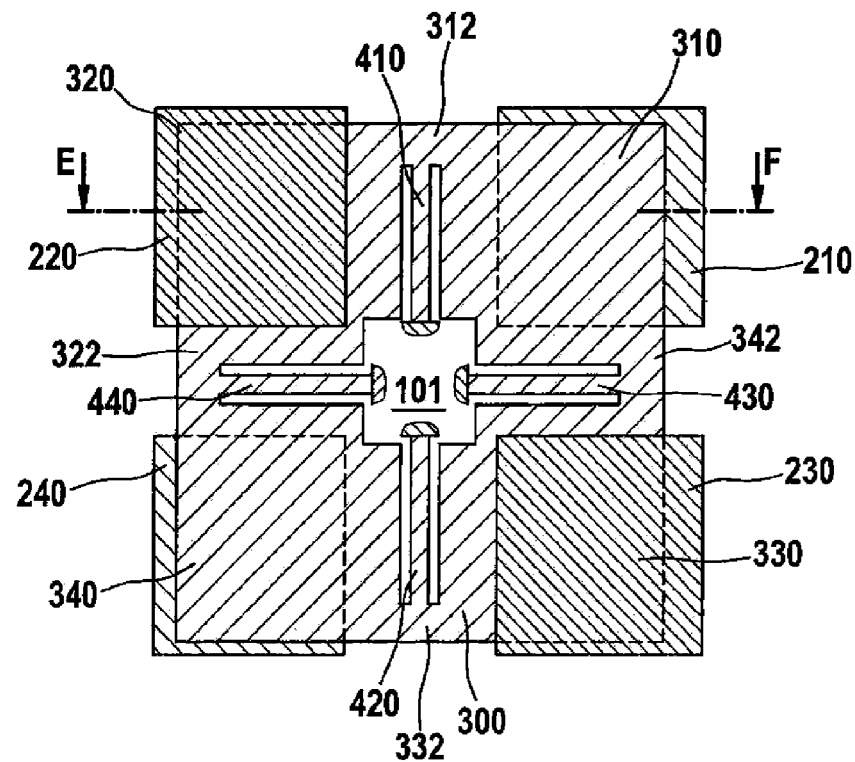
FIG. 12 shows an acceleration sensor fashioned in the manner of a trampoline, having four electrode structures.

The design according to the present invention, depicted on the basis of the foregoing Figures, can also be transferred to a symmetrical sensor structure such as a trampoline that undergoes only translational deflection. FIG. 12 shows, as an example, such an acceleration sensor in a top view. Rectangular sensor body 300 is made up of four segments or wings 310, 320, 330, 340, which are likewise essentially rectangular. The individual segments are separated from each other by openings in each of which there runs a spring element 410, 420, 430, 440. The individual segments 310, 320, 330, 340 are connected to one another only via webs 312, 322, 332, 342, which simultaneously act as anchor points for the spring elements.

The four spring elements 410, 420, 430, 440 open, in star-shaped fashion, into a central suspension point 101 of the trampoline-shaped sensor body 300, which can for example be fashioned as a fastening base (not shown). In the present exemplary embodiment, electrode structures allocated to one another are connected to one another in crossed fashion, the two electrodes 210, 240, forming a common capacitance, being formed in lower sub-layer 121 of functional layer 120, and the two other electrode structures 220, 230, also representing a common capacitance, being formed in upper sub-layer 122 of functional layer 120. Electrode structures 220, 230, or 210, 240, representing a common capacitance, may however also be fashioned in different sub-layers 121, 122 of common functional layer 120. Due to a uniform distribution of the masses or torques acting on the system, the deflection of trampoline-type sensor element 300 may be limited solely to direction 500, which is orthogonal relative to the surface of base substrate 100. In this way, a very precise measurement of the acceleration in the respective direction is possible.

Figure 13:
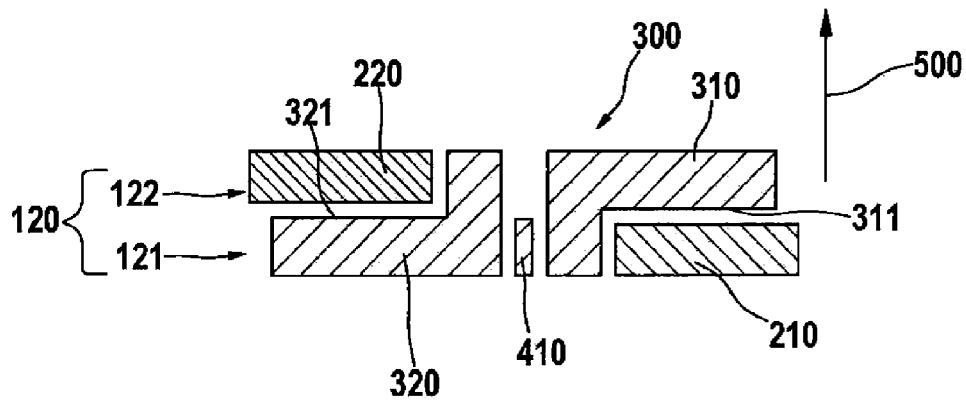
FIG. 13 shows a cross-sectional representation of the sensor shown in FIG. 12, along the line E-F.

FIG. 13 shows a cross-section through the sensor system shown in FIG. 12. In the sectional representation, the profile of trampoline-shaped sensor body 300 is illustrated along the line E-F, and the system of the respective electrode structures 210, 220 is illustrated. Due to this arrangement of the components, when an acceleration acts orthogonal to the surface of base substrate 100, due to a corresponding movement of sensor body 300 the distance is reduced between first electrode structure 210 and wing 310 situated above it, while the distance between second sensor structure 220 and wing 320 situated below it is increased. In this way, a fully differential evaluation of the deflection can take place. As can also be seen from the sectional representation shown in FIG. 13, the overall system is formed solely of the two sub-layers 121, 122 of functional layer 120, spring element 410 being formed solely from lower sub-layer 221 in the following example.

In the following FIGS. 14 through 21, the manufacturing method according to the present invention is described in more detail, the sensor system known from FIGS. 3 and 4 being manufactured using known techniques.

Figure 14:
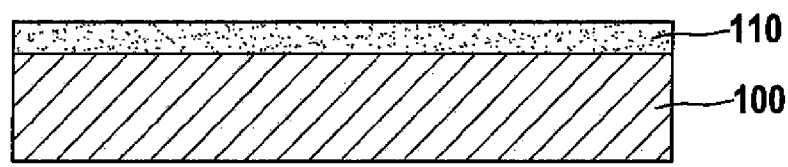
FIGS. 14, 15, 16, 17, 18, 19, 20 and 21 show a method according to the present invention for manufacturing such a micromechanical acceleration sensor.

FIG. 14 shows base substrate 100 on which a first sacrificial layer 110 has already been produced. In the present example, a silicon wafer is used as base substrate 100. As an example, first sacrificial layer 110 has been produced by the deposition of an oxide in a suitable thickness. With the aid of a suitable deposition method, first the first sub-layer 121 of functional layer 120 is produced on oxide layer 110 in a suitable thickness. This can take place for example through epitaxial deposition of a polysilicon layer. In order to obtain a specified layer thickness, subsequently a planarization step can be carried out in which first sub-layer 121 is removed for example by a chemical-mechanical removal method (CMP).

Figure 15:
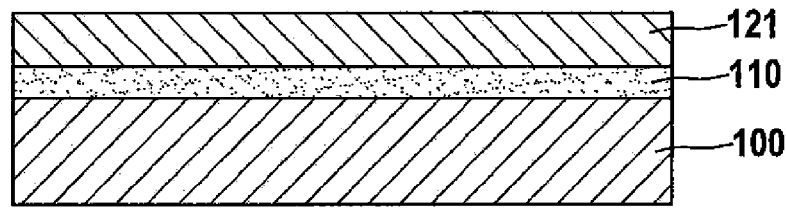

If first sub-layer 121 was produced as a semiconductor layer, a doping of the semiconductor layer can be carried out in order to produce a conductivity. This can take place by implantation or diffusion processes. FIG. 15 shows the correspondingly formed layer stack.

Figure 16:
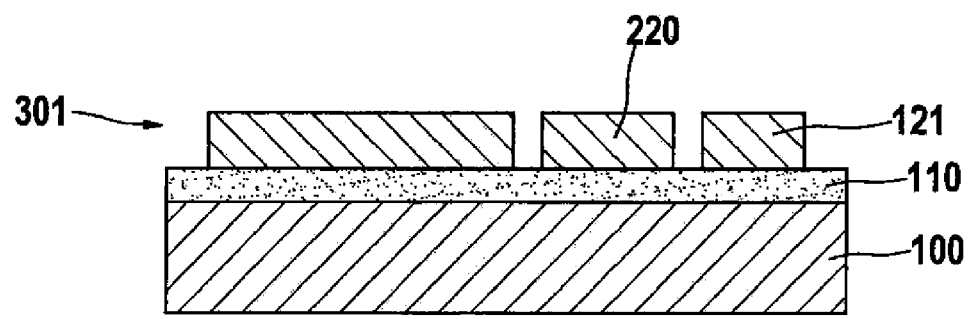

In the following, the structures of lower plane 301 of sensor element 300, and first electrode structure 210, formed from the same sub-layer 121, are produced. For this purpose, sub-layer 121 is removed in specified areas down to first sacrificial layer 110, for example using a suitable photolithographic structuring method. In a photolithographic method, the desired structures are first produced in a lacquer layer, which, after development and selective removal of the exposed or unexposed areas, acts as a mask for an etching process in order to transfer the structures into the layer situated thereunder. In the structuring, a block 210, which acts as a first electrode in the sensor system, is spatially completely separated from lower plane 301 of sensor element 300. FIG. 16 shows a correspondingly structured layer stack.

Figure 17:
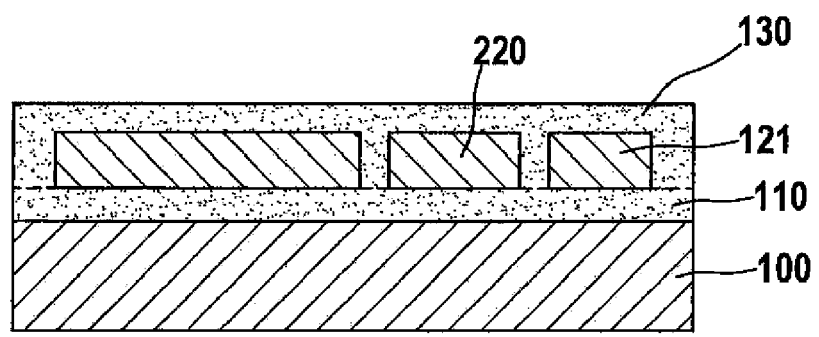

In a subsequent method step, a second sacrificial layer is produced on the surface of the layer stack shown in FIG. 16. This may take place through the deposition of an oxide. In order to achieve a better deposition of the oxide in the trench structures, these trench structures can be separately filled ahead of time with oxide, for example through thermal oxidation. A corresponding layer stack having a produced second oxide layer is shown in FIG. 17. Because the two sacrificial layers 110, 130 may only be made of the same oxide material, and therefore in principle do not have to form a homogenous layer, the transition between them is shown by a broken line.

Figure 18:
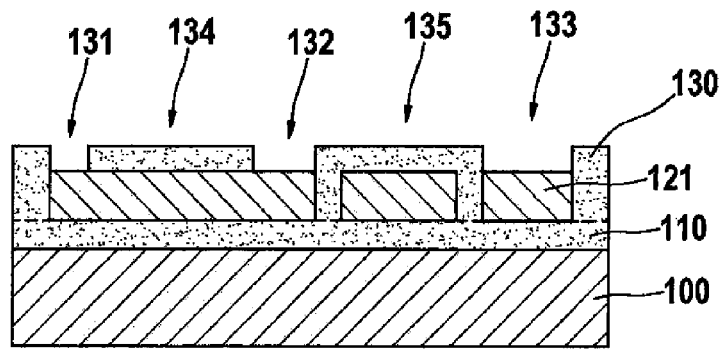

In order to produce a connection between the lower plane formed in first sub-layer 121 and the upper plane, still to be produced through deposition and structuring of second sub-layer 122, of sensor element 300, before the deposition of second sub-layer 122 second sacrificial layer 130 is removed in areas provided for this purpose, in a separate structuring step. This can take place for example using a photolithographic method. As is shown in FIG. 18, in the present example the oxide is removed in three areas 131, 132, 133, down to first sub-layer 121 situated under it. In contrast, the oxide remains as a separating layer in area 135 above first electrode structure 210, as well as in area 134, as a support for second electrode structure 220, which is still to be formed.

Figure 19:
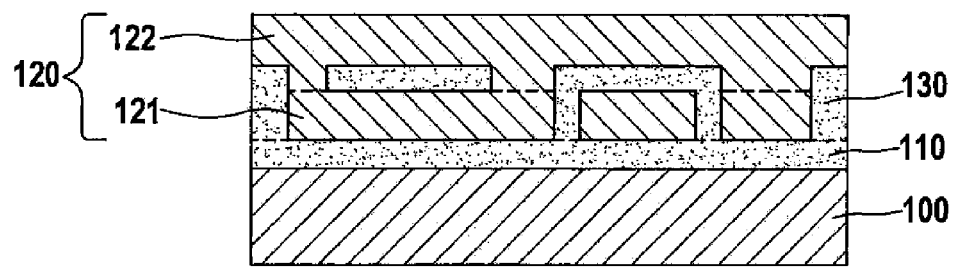

In a subsequent method step, second sub-layer 122 of functional layer 120 is produced on structured second oxide layer 130. This takes place for example through epitaxial growth of a second polysilicon on layer; for this purpose, other suitable materials and deposition methods are also possible. In order to set a specified layer thickness of second sub-layer 121, a planarization step may be carried out, for example using a chemical-mechanical removal method (CMP). FIG. 19 shows a layer stack including second sub-layer 122 after the planarization. Here, the two sub-layers 121, 122 may form a continuous layer on the previously exposed locations 131, 132, 133 of first sub-layer 121. This is indicated by the broken line.

Figure 20:
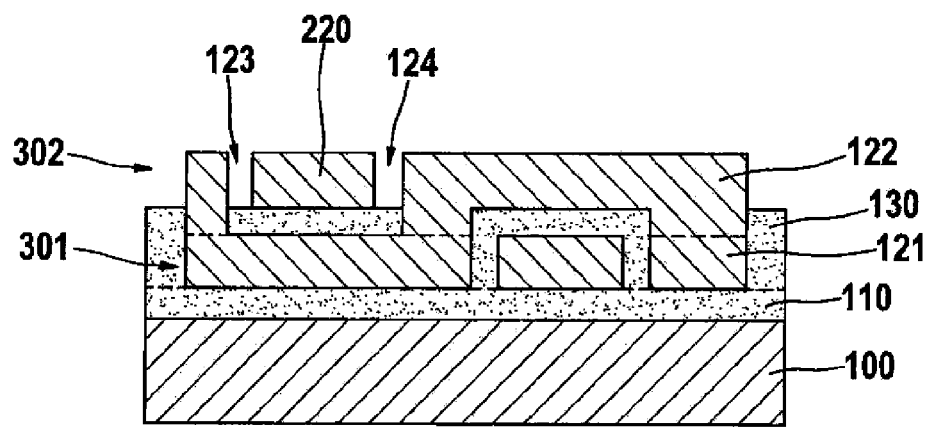

In the following method step, the second plane of sensor element 300, and second electrode structure 220, are defined. This takes place through a structuring step in which the second sub-layer is removed in specified areas down to second sacrificial layer 130, which may be done using a photolithographic structuring method. Prior to this, in a doping step a desired doping of second sub-layer 122 can be achieved. FIG. 20 shows a correspondingly structured second functional layer 122 having the structures of second plane 302 of sensor element 300, as well as second electrode structure 220, spatially separated therefrom.

Figure 21:
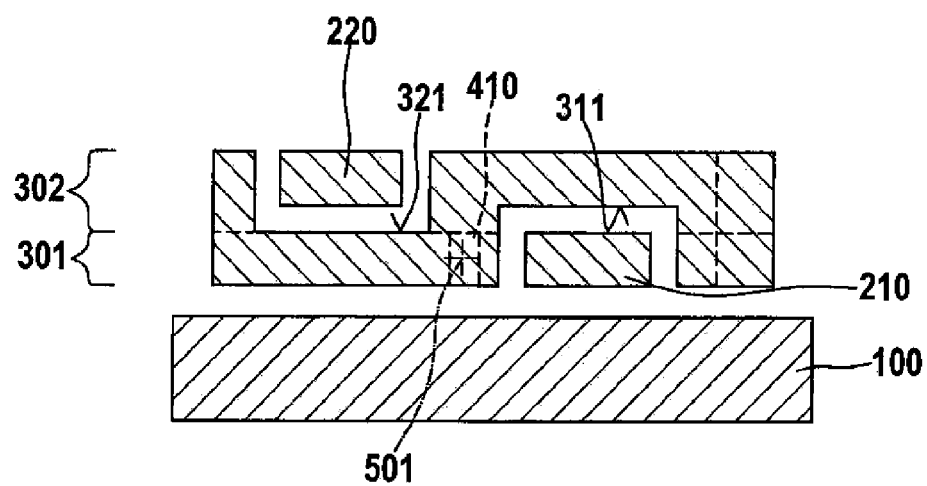

Subsequently, there takes place the removal of the remaining first and second sacrificial layer 110, 130. This may take place using a suitable isotropic etching method in which the oxide material is etched in a highly selective manner to the material of sub-layers 121, 122. For this purpose, the structures can for example be exposed to a reactive gas phase. In order to facilitate the removal of the oxide underneath sensor element 300, or underneath electrode structures 210, 220, defined through-openings (not shown) can be provided in the corresponding structures. FIG. 21 shows the sensor system after the removal of the oxide material.

In order to realize a suitable suspension of sensor element 300, spring elements 410, 420, connected to the base body of sensor element 300, are also produced already during the structuring of lower sub-layer 121; in FIG. 21, only first torsion web 410 is shown.

The sensor design according to the exemplary embodiments and/or exemplary methods of the present invention, shown as an example in the foregoing description and the drawings, can in principle also be realized in other embodiments. For example, more than two sub-layers may be used to construct the functional plane and thus also to construct the components of the acceleration sensor. In this way, if warranted more complex profiles of the sensor element can be produced. In addition, methods are also possible in which the base body of the sensor element and the electrode structures are structured independently of each other.

What is claimed is:

1. An acceleration sensor, comprising:
   a base substrate;
   a first electrode structure situated so as to be stationary relative to the base substrate;
   a sensor element, having a first electrode area, and situated so as to be capable of deflection relative to the base substrate; and
   at least one spring element via which the sensor element is coupled elastically to the base substrate so that a deflection of the sensor element relative to the base substrate brings about a change of the distance between the first electrode structure and the first electrode area;
   wherein the sensor element and the first electrode structure are situated at least partially one over the other, and
   wherein the sensor element and the first electrode structure are formed from a common functional layer.

2. The acceleration sensor of claim 1, wherein the sensor element has a second electrode area that corresponds to a second electrode structure, situated stationary relative to the base substrate, so that a deflection of the sensor element relative to the base substrate brings about a change in the distance between the second electrode structure and the second electrode area, the second electrode area and the second electrode structure being formed from the common functional layer.

3. The acceleration sensor of claim 1, wherein the sensor element is formed from a first sub-layer and a second sub-layer of the functional layer, an electrode structure and the associated electrode area being respectively formed from different sub-layers of the functional layer.

4. The acceleration sensor of claim 2, wherein the two electrode structures are two sub-electrodes of a common electrode.

5. The acceleration sensor of claim 2, wherein the sensor element has at least two wings between which there is respectively situated at least one spring element, the two electrode areas being situated in different wings.

6. The acceleration sensor of claim 1, wherein the sensor element is in the form of a rocker, the rocker having two wings having an asymmetrical mass distribution, and the rocker being coupled in rotatable fashion to the base substrate via at least two spring elements which are torsion webs.

7. The acceleration sensor of claim 6, wherein the asymmetrical mass distribution is realized by a seismic additional mass situated on one of the two wings.

8. The acceleration sensor of claim 1, wherein the sensor element is a trampoline that has at least four wings that are each connected to one another via a web, at least one respective spring element being situated between the wings, running from the respective web to a central fastening base, the wings having an essentially symmetrical mass distribution.

9. The acceleration sensor of claim 3, wherein a spring element is formed from at least one of the first sub-layer and the second sub-layer.

10. An acceleration sensor, comprising:
    a base substrate;
    a plurality of electrode structures situated so as to be stationary relative to the base substrate, a first of the electrode structures covering a first section of the base substrate and a second of the electrode structures covering a second section of the base substrate;
    a sensor element, having a first electrode area, and situated so as to be capable of deflection relative to the base substrate; and
    at least one spring element via which the sensor element is coupled elastically to the base substrate so that a deflection of the sensor element relative to the base substrate brings about a change of the distance between the first electrode structure and the first electrode area;
    wherein a first section of the first electrode area is situated between the first electrode structure and the first section of the base structure and the second electrode structure is situated between a second section of the first electrode area and the second section of the base structure, and
    wherein the sensor element and the first electrode structure are formed from a common functional layer.

* * * * *